United States Patent [19]
Martucci

[11] Patent Number: 5,170,011
[45] Date of Patent: Dec. 8, 1992

[54] HOSE ASSEMBLY
[75] Inventor: Norman S. Martucci, Sterling Heights, Mich.
[73] Assignee: Teleflex Incorporated, Limerick, Pa.
[21] Appl. No.: 765,438
[22] Filed: Sep. 25, 1991
[51] Int. Cl.⁵ .......................................... F16L 11/12
[52] U.S. Cl. ...................... 174/47; 138/118; 138/137; 361/215
[58] Field of Search ............. 174/47, 110 FC, 110 W, 174/120 SC, 120 G; 361/215; 138/118, 137, 138, 139, 140, DIG. 3, DIG. 9

[56] References Cited
U.S. PATENT DOCUMENTS

| | | | |
|---|---|---|---|
| 3,109,461 | 11/1963 | Wolff et al. | 138/137 |
| 3,473,087 | 10/1969 | Slade | 174/47 |
| 4,104,095 | 8/1978 | Shaw | 138/144 X |
| 4,108,701 | 8/1978 | Stanley | 174/47 X |
| 4,312,383 | 1/1982 | Kleykamp | 174/47 X |
| 4,394,705 | 7/1983 | Blachman | 174/47 X |
| 4,599,677 | 8/1971 | O'Brien | 138/137 X |
| 4,800,109 | 1/1989 | Washizu | 138/137 X |
| 5,022,459 | 6/1991 | Chiles et al. | 174/47 X |
| 5,052,444 | 10/1991 | Messerly et al. | 174/47 X |
| 5,062,456 | 11/1991 | Cooke et al. | 138/DIG. 3 X |

Primary Examiner—Morris H. Nimmo
Attorney, Agent, or Firm—Reising, Ethington, Barnard, Perry & Milton

[57] ABSTRACT

A lightweight hose assembly (10) of the type adapted for conveying fuels and other corrosive fluids. The assembly (10) includes a tubular inner liner (12) comprising a polymeric fluorocarbon material resistant to chemical and heat degradation, and is characterized by including an outer liner (14) comprising an expanded polyamide material disposed about the inner liner (12). The assembly (10) further includes a conductive strip (30) formed along the inner liner (12) for dissipating electrical charges accumulating along the inner liner (12).

13 Claims, 2 Drawing Sheets

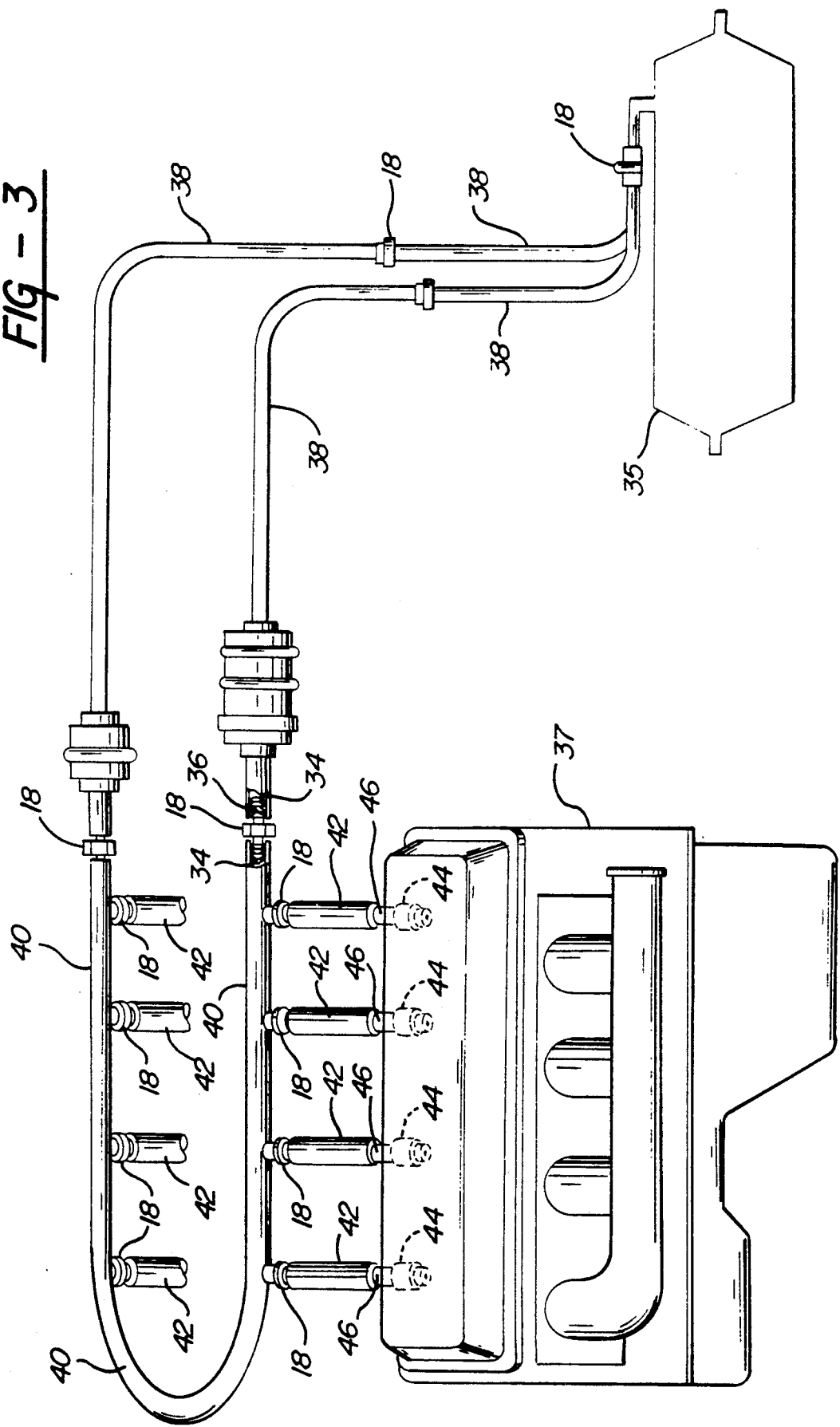

HOSE ASSEMBLY

BACKGROUND OF THE INVENTION

1. Technical Field

The subject invention relates to a hose construction. More specifically, the subject invention relates to a hose assembly comprising a polymeric fluorocarbon inner liner having an expanded polyamide outer liner disposed thereabout.

2. Description of the Related Art

Hose assemblies for conveying fuels are well-known in the art. Such assemblies are exposed to a variety of fuel mixtures and fuel additives in addition to extreme engine temperatures. Thus, such hose assemblies must be chemically as well as heat resistant to degradation as a result of chemical and heat exposure.

Polymeric fluorocarbon materials such as polytetrafluoroethylene possess the requisite chemical and temperature resistant properties for most fuel hose applications. Unfortunately, however, polymeric fluorocarbon materials exhibit relatively poor tensile and hoop strengths. As a consequence, such fluorinated materials are prone to kinking. Such kinking remains permanent and provides a continual resistance to fluid flow through the hose assembly. Moreover, as a result of the fluorinated material's low tensile strength, attachment of securing or coupling members to the hose assembly is unreliable.

Various approaches have been described for offering additional strength to a polymeric fluorocarbon liner. One approach involves braiding fibers about the inner fluorocarbon liner. The braided fibers offer additional strength to the fluorocarbon liner resulting in a hose assembly that resists kinking. An example of such an approach is disclosed in co-pending U.S. Ser. No. 535,734, filed Jun. 11, 1990 and assigned to the assignee of the subject invention. A drawback to such braiding techniques, however, is the extensive labor and time involved.

Additional examples for strengthening an inner fluorocarbon liner with an outer liner are shown in U.S. Pat. No. 2,991,808 to Siegmann, U.S. Pat. No. 4,104,095 to Shaw, and U.S. Pat. No. 4,800,109 to Washizo, all of which disclose the use of a polytetrafluoroethylene inner liner supported within an outer liner.

Finally, U.S. Pat. No. 3,547,162 to Schaerer discloses a pipe assembly wherein an inner cross-linked polyolefin liner is supported within an expanded urethane or PVC outer liner.

SUMMARY OF THE INVENTION AND ADVANTAGES

According to the present invention, there is provided a hose assembly comprising a tubular inner liner and an outer liner disposed about the inner liner. The inner liner comprises a polymeric fluorocarbon material resistant to chemical and heat degradation. The hose assembly is characterized by the outer liner comprising an expanded polyamide material for increasing the strength of the hose assembly.

Accordingly, the present invention provides a hose assembly including an inner liner having chemical and heat resistant properties and an expanded polyamide outer liner providing support and strength to the inner liner thereby increasing the hose assembly's hoop and tensile strength. Thus, the present hose assembly is resistant to kinking and possess sufficient strength for allowing the attachment of securing or coupling members thereto.

An advantage of the present hose assembly's outer liner comprising an expanded polyamide material is a substantial reduction in the weight of the hose assembly while maintaining the necessary hose strength. The present hose assembly's expanded polyamide outer liner not only provides strength to the hose assembly but also provides ample protection from external heat and chemical degradation at a substantially reduced weight.

FIGURES IN THE DRAWINGS

Other advantages of the subject invention will be readily appreciated as the same becomes better understood by reference to the following detailed description when considered in connection with the accompanying drawings wherein:

FIG. 3 is a schematic view, of a fuel system showing three separate applications of the subject invention.

DETAILED DESCRIPTION OF THE PREFERRED EMBODIMENT

Figure 1:
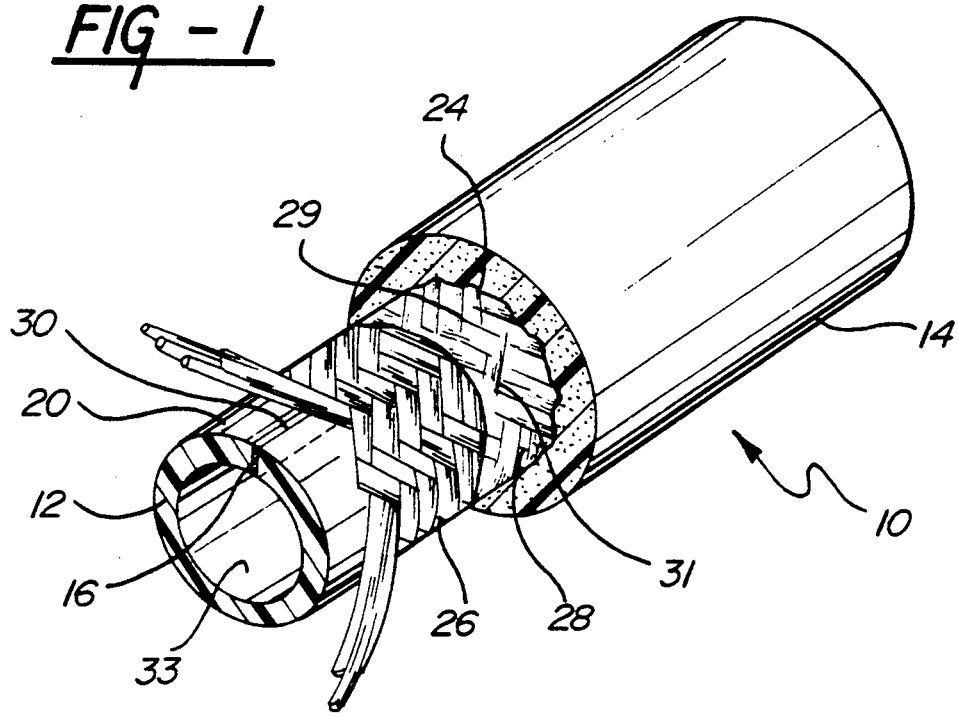
FIG. 1 is a perspective view partially broken away and in cross-section of an alternate embodiment of the subject invention.
Figure 2:
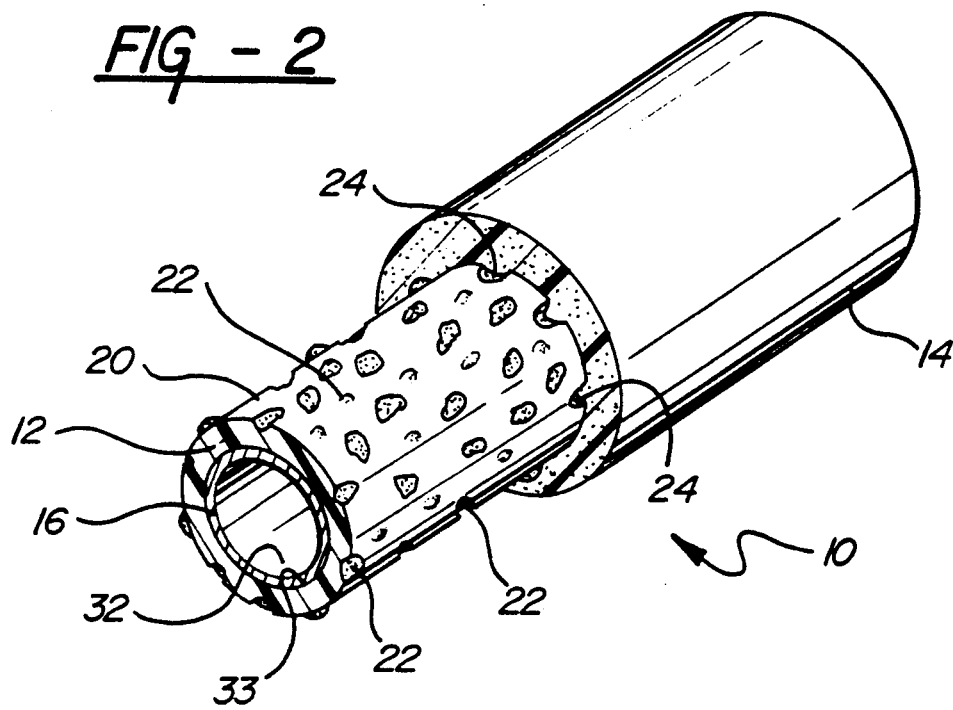
FIG. 2 is a perspective view partially broken away and in cross-section of the preferred embodiment of the subject invention.

A hose assembly made in accordance with the present invention is generally shown at 10 in FIGS. 1 and 2. The assembly 10 includes a tubular inner liner 12, an outer liner 14 disposed about the inner liner 12, an integral conductive means 16 coextensive with the length of the inner liner 12, and a coupling means 18 (FIG. 3) adapted to engage the ends of the hose assembly 10.

The tubular inner liner 12, as best shown in FIGS. 1 and 2, comprises a polymeric fluorocarbon material resistant to both chemical and heat degradation, thus allowing a variety of fluids, particularly automotive fuels and fuel additives, e.g., detergents, alcohols, etc., to pass through the inner liner 12 without corroding or degradating the inner liner 12. The inner liner 12 is preferably extruded using well-known melt or paste extrusion techniques and has a wall thickness of between 0.001 and 0.120 inches. Although the inner liner 12 may be made of any number of polymeric fluorocarbon materials, the inner liner 12 is ideally made from a polymer of the following: polytetrafluoroethylene (PTFE), the homopolymer of tetrafluoroethylene sold under the trademark TEFLON by DuPont; perfluorinated ethylene-propylene (FEP), the copolymer of tetrafluoroethylene and hexafluoropropylene sold under the trademark TEFLON FEP by DuPont; perfluoralkoxy fluorocarbon resins (PFA), the copolymer of tetrafluoroethylene-perfluorovinyl ether sold under the trademark TEFLON PFA by DuPont; or ethylene tetrafluoroethylene (ETFE), the copolymer of ethylene and tetrafluoroethylene sold under the trademark TEFZEL by DuPont. In addition to the aforementioned polymeric fluorocarbon materials, polychlorotrifluoroethylene, the homopolymer of chlorotrifluoroethylene, and polychlorotrifluoroethylene-ethylene, the copolymer of chlorotrifluoroethylene and ethylene may also be used.

The outer liner 14, best shown in FIGS. 1 and 2, is disposed about the inner liner 12. The outer liner 14 comprises a polyamide material for increasing the strength of the hose assembly 10. More specifically, the outer liner 14 allows the inner liner 12 to be bent without kinking. That is, the outer liner 14 provides strength to the inner liner 12 upon bending. This is commonly referred to as hoop strength. Thus, by disposing the outer liner 14 about the inner liner 12, the hoop strength of the inner liner 12 is increased. Further, the outer liner 14 adds to the working pressure of the hose. That is, the outer liner 14 provides strength to the inner liner 12 and allows the inner liner 12 to accommodate a fluid under pressure. Additionally, the outer liner 14 adds to the tensile strength of the hose assembly 10. When coupling members 18 (FIG. 3) are disposed on the ends of the hose assembly 10, as described below, the outer liner 14 increases the tensile strength of the hose assembly 10 sufficiently to fixedly connect the coupling member 18 (FIG. 3) to the hose assembly 10.

Although the outer liner 14 may be made of any number of polyamide materials, preferably the outer liner 14 is made from a polyamide material selected from the following: nylon 6; nylon 6,6; nylon 11; or nylon 12. It should be noted the selection of a particular polyamide material should be based upon the physical requirements of the particular hose assembly application. For example, nylon 6 and nylon 6,6 offer higher heat resistant properties than nylon 11 or nylon 12, whereas nylon 11 and nylon 12 offer better chemical resistant properties than nylon 6 or nylon 6,6. Thus, the ultimate selection of a polyamide material should be based upon requirements of a particular hose assembly application. In addition to those polyamide materials previously mentioned, other nylon materials such as: nylon 6,12; nylon 6,9; nylon 4; nylon 4,2; nylon 4,6; nylon 7; and nylon 8 may also be used. Ring containing polyamides including aliphatic-aromatic polyamides e.g., nylon 6,T and nylon 6,I may also be used. Finally, the outer liner 14 may also comprise various polyamide blends. Again, it is noted that the selection of a particular polyamide material is dependent upon the specific physical requirements of a particular hose assembly application.

Preferably, the outer liner 14 is comprised of an expanded polyamide material, as shown in FIGS. 1 and 2. Alternatively, the outer liner 14 may comprise an unexpanded polyamide material (not shown). Although expanded and unexpanded polyamide outer liners 14 both offer the hose assembly 10 increased hoop and tensile strength, the expanded polyamide material is preferred. The expanded polyamide material offers the hose assembly 10 substantially the same degree of strength as the unexpanded material while significantly reducing the weight of the hose assembly 10. That is, the expanded polyamide material is significantly lighter in weight than the unexpanded polyamide material due to the presence of void spaces therein formed during the expansion process. The expansion process, commonly known in the art as "foaming", generally takes place while extruding the outer liner 14. Such foaming processes generally require blowing agents such as CELOGEN HT 550 ™, an exothermic blowing agent sold by Uniroyal Chemicals or EXTIVEX 537 ™, an endothermic blowing agent sold by J. M. Huber Corporation. The blowing agent is generally intermixed with the polyamide material during the extrusion of the outer liner 14 and causes expansion of the polyamide by producing gas, thereby forming void spaces within the outer liner 14.

Methods for fabricating the present hose assembly 10 are well-known in the art. One particular well-known method involves a two-part extrusion process typically known as "cross-head" extrusion. The typical "cross-head" extrusion method involves first extruding an inner liner, such as the polymeric fluorocarbon inner liner 12, then extruding an outer liner thereover, such as the expanded polyamide outer liner 14. This method of fabrication is particularly effective when utilizing an inner liner 12 comprising polytetrafluoroethylene. This is primarily due to the difficulty encountered in extruding polytetrafluoroethylene. That is, polytetrafluoroethylene generally must be paste extruded whereas thermoplastic polymeric fluorocarbon materials may often be melt extruded. When utilizing thermoplastic polymeric fluorocarbon materials, coextrusion methods of fabricating may be applicable. As commonly known in the art, coextrusion methods involve utilizing two extruders at once thereby forming both inner and outer liners simultaneously.

Due to the chemical inertness and general lubricous nature of polymeric fluorocarbon materials, relative movement between the inner 12 and outer 14 liners is often encountered. In hose applications which require immobility among adjacent liners, the present hose assembly 10 may be modified to eliminate such relative movement between the inner 12 and outer 14 liners.

One embodiment for eliminating relative movement between the inner 12 and outer 14 liners involves etching an outer surface 20 of the inner liner 12 prior to disposing the outer liner 14 thereabout, as shown in FIG. 2. Etching techniques are well-known in the art. Examples of common etching techniques include acid treatment, plasma treatment, and mechanical scuffing. Subsequent to etching, the outer surface 20 of the inner liner 12 maintains an irregular configuration 22 as shown in FIG. 2. Essentially the irregular configuration 22 comprises a rough surface having a plurality of cavities and protuberances therein.

Subsequent to etching the outer surface 20 of the inner liner 12, the outer liner 14 is extruded thereover. During this extrusion, an inner surface 24 of the outer liner 14 shapes into mating engagement with the irregular configuration 22 of the outer surface 20 of the inner liner 12 thereby resulting in a mechanical bond therebetween. This mechanical bond prohibits relative movement (rotational or longitudinal) between the inner 12 and outer 14 liners.

An alternative embodiment for eliminating relative movement between the inner 12 and outer 14 liner is shown in FIG. 1. The alternative embodiment includes disposing at least one braided layer between the inner 12 and outer 14 liners. More specifically, the alternative embodiment includes a braided or woven layer 26 disposed in an interleaving fashion, or wrapped tightly about the outer surface 20 of the inner liner 12. Preferably, the material used for the braided layer 26 is a glass fiber. Glass fibers are preferred due to their relative low cost and superior heat resistant properties.

The braided or woven fibers may be tightly wound or they may be loosely wound about the inner liner 12, having wide gaps between adjacent fibers. The assembly 10 further includes intermediate coating 28 dispersed in the braided layer 26. The intermediate coating 28 ideally comprises a fluorocarbon polymer in a dispersion. The intermediate coating 28 as applied, comprises a fluorocarbon polymer and at least one dispersing agent. Preferably the dispersion agent is water. It will be appreciated that any suitable dispersion agent may be used. The preferred fluorocarbon polymer is a material selected from the following: the polymer of tetrafluoroethylene (PTFE); the copolymer of tetrafluoroethylene and hexafluoropropiene (FEP); the copolymer of tetrafluoroethylene-perfluorovinyl ether (PFA); or the copolymer of ethylene and tetrafluoroethylene (PETFE). The intermediate coating 28 coats or is dispersed throughout the braided layer 26. Subsequent to coating, the dispersion agent is removed from the intermediate coating by drying. This leaves the intermediate coating 28 essentially comprising only the fluorocarbon material, dispersed throughout the braided layer and secured or bonded to the outer surface 20 of the inner liner 12. An outer surface 29 of the intermediate coating 28 maintains an irregular configuration 31 including a rough surface. Subsequent to position of the braided layer 26 and intermediate coating 28 about the inner liner 12, the outer liner 14 is extruded thereover. During this extrusion, the inner surface 24 of the outer liner 14 shapes into mating engagement with the irregular configuration 31 of the intermediate coating 28 thereby resulting in the mechanical bond therebetween. This mechanical bond prohibits relative movement (rotational or longitudinal) between the braided layer 26/intermediate coating 28 and outer liner 14.

As fluid flows through the inner liner 12, electrical charges tend to build throughout the length of the inner liner 12. In order to prevent these electrical charges from accumulating, the inner liner 12 preferably includes an integral longitudinal conductive means 16 coextensive with the length of the inner liner 12 for conducting an electrical charge along the length of the inner liner 12. Preferably the integral conductive means 16 comprises a conductive strip 30 of carbon black, as shown in FIG. 1. Alternatively, the integral conductive means 16 may comprise an inner layer 32 of carbon black positioned adjacent an inner surface 33 of the inner liner 12 as shown in FIG. 2. Alternatively, the integral conductive means 16 may be interdispersed throughout the inner liner 12 by intermixing carbon black throughout the polymeric fluorocarbon material while the inner liner 12 is extruded (not shown). The braided layer 26, intermediate coating 28, and outer liner 14 are all preferably electrically non-conductive. This is important in that electrical charges applied to the exterior of the hose assembly 10 will not be conducted along its length nor to the fluid passing therethrough. It will be appreciated that the integral conductive means may comprise conductive material other than carbon black.

The assembly 10 further includes coupling means 18 as shown in FIG. 3. The coupling means 18 is adapted to engage the ends of the hose assembly 10 for interconnecting the hose assembly 10 to a flow of fluid, e.g., fuel flow to and from a fuel tank 35. More particularly, the coupling means 18 includes a coupler 18 or joint having an insert portion 34 for inserting into and engaging the inner surface 33 (FIGS. 1 and 2) of the inner liner 12. The insert portion 34 may have a plurality of barbs 36 for engaging the inner surface 33 (FIGS. 1 and 2) of the inner liner 12, as best viewed in FIG. 3. The coupling means 18 may also include an engaging portion (not shown) extending longitudinally from the insert portion 34 for engaging a fitting (not shown). The engaging portion may comprise a male threaded member or female threaded member (not shown). The engaging portion may comprise any configuration that will cooperate with the member to which it is to be connected with. For example, the engaging portion may comprise a socket to receive a mating ball joint (not shown). Alternatively, in place of the engaging portion, the coupling means 18 may provide an additional insert portion 34 for inserting into and engaging the interior surface of the inner liner 12 of another hose assembly 10 as shown in FIG. 3. Thus, the coupling means 18 may operate as a joint between independent hose assemblies 10 thereby interconnecting them to allow fluid flow therebetween. The coupling means 18 is preferably made from an organic polymeric material and mechanically connected to the hose assembly 10, as shown in FIG. 3. Alternatively, the coupling means 18 may be molded to the hose assembly (not shown).

A typical application of the present hose assembly 10 is shown in FIG. 3. FIG. 3 discloses an engine 37, fuel tank 35, and three distinct uses of the present hose assembly 10. A fuel line for conveying fuel between a fuel rail 40 and the fuel tank 35 is shown at 38. Coupling means 18, as previously described, interconnect the fuel line 38 with the fuel rail 40 and fuel tank 35. The fuel rail 40 provides a flow of fuel to a plurality of fuel jumpers 42. Although not shown in FIG. 3, it will be appreciated by those skilled in the art that a gas manifold and throttle body may be substituted for the fuel rail 40. The fuel jumpers 42 are interconnected to the fuel rail 40 by way of the coupling means 18, as shown in FIG. 3 or alternatively, may be molded directly to the fuel rail 40 (not shown). Fuel injectors for injecting fuel into individual fuel cylinders (not shown) are shown in phantom at 44. The fuel injectors 44 may include male supports 46 for inserting and engaging the inner surface of the fuel jumper 42, in a similar manner as the insert portion 34 of the coupling mean 18 engages the inner surface 33 of the inner liner 12 (previously described).

Although the diameters of the fuel line 38, fuel rail 40, and fuel jumper 42 may differ, all are comprised of the hose assembly 10 as previously described. That is, each includes a polymeric fluorocarbon inner liner 12 and an expanded polyamide outer liner 14. Due to possible variances in diameter among each hose assembly 10, i.e., fuel line 38, fuel rail 40, and fuel jumper 42, it will be understood that the insert portions 34 of the coupling means 18 used to interconnect each hose assembly 10 must vary correspondingly to accommodate each specific hose assembly 10 diameter.

Although the present hose assembly has been described for conveying fuels, it will be readily appreciated that the present hose assembly 10 may be used for conveying a variety of fluids, e.g., cooling fluids, lubricating fluids, etc.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood, that within the scope of the appended claims wherein reference numerals are merely for convenience and not to be in any way limiting, the invention may be practiced otherwise than as specifically described.

What is claimed:
1. A hose assembly (10) comprising:
   a tubular inner liner (12) and an outer liner (14) disposed about said inner liner (12), said inner liner (12) comprising a polymeric fluorocarbon material resistant to chemical and heat degradation, said assembly characterized by said outer liner (14) comprising an expanded polyamide material for increasing the strength of said hose assembly (10).

2. An assembly as set forth in claim 1 further characterized by said polymeric fluorocarbon material being chemically resistant to fuels and fuel additives.

3. An assembly as set forth in claim 2 further characterized by said inner liner (12) including an outer surface (20) having an irregular configuration (22) and said outer liner (14) including an inner surface (24) in mating engagement with said outer surface (20) of said inner liner (12) to limit relative movement between said inner liner (12) and said outer liner (14).

4. An assembly as set forth in claim 2 further characterized by including at least one braided layer (26) disposed between said inner (12) and outer (14) liners.

5. An assembly as set forth in claim 4 further characterized by including an intermediate coating (28) dispersed in said braided layer (26) for securing said inner liner (12) to said outer liner (14).

6. An assembly as set forth in claim 5 further characterized by said intermediate coating (28) including an outer surface (29) having an irregular configuration (31) and said outer liner (14) including an inner surface (24) in mating engagement with said outer surface (29) of said intermediate coating (28) to limit relative movement between said inner liner (12) and said outer liner (14).

7. An assembly as set forth in claim 6 further characterized by said intermediate coating (28) essentially comprising a fluorocarbon material.

8. An assembly as set forth in claim 7 further characterized by said braided layer (26) comprising glass fibers.

9. An assembly as set forth in either claim 3 or 4 further characterized by said expanded polyamide material of said outer liner (14) including a material selected from the group consisting of:
nylon 6;
nylon 6.6;
nylon 11; and
nylon 12.

10. An assembly as set forth in claim 9 further characterized by said polymeric fluorocarbon material of said inner liner (12) including a material selected from the group consisting of:
polytetrafluoroethylene;
perfluorinated ethylene-propylene;
perfluoralkoxy fluorocarbon resin;
polyfluoroethylene.

11. An assembly as set forth in claim 10 further characterized by said inner liner (12) including an integral conductive means (16) coextensive with the length of said inner liner (12) for conducting electrical charges along the length of said inner liner (12).

12. An assembly as set forth in claim 11 further characterized by said integral conductive means (16) including carbon black.

13. An assembly as set forth in claim 12 further characterized by including a coupling means (18) adapted to engage the ends of said hose assembly (10) for interconnecting said hose assembly (10) to a flow of fluid.

* * * * *